United States Patent [19]

Lim

[11] Patent Number: 5,265,145
[45] Date of Patent: Nov. 23, 1993

[54] ALPHANUMERIC CALLER IDENTIFICATION TELEPHONE

[76] Inventor: Boon C. Lim, Flat B, 26th Floor, Begonia Mansion, Taikooshing, Quarry Bay, Hong Kong

[21] Appl. No.: 676,171

[22] Filed: Mar. 28, 1991

[51] Int. Cl.⁵ .................. H04M 1/21; H04M 1/57; H04M 1/66
[52] U.S. Cl. ..................... 379/88; 379/142; 379/199; 379/374; 379/442; 379/443
[58] Field of Search .......... 379/142, 199, 447, 443, 379/374, 88, 190, 375, 376, 442

[56] References Cited

U.S. PATENT DOCUMENTS

| | | | |
|---|---|---|---|
| 4,242,539 | 12/1980 | Hashimoto | 379/142 |
| 4,304,968 | 12/1981 | Klausner et al. | 379/69 |
| 4,582,956 | 4/1986 | Doughty | 379/94 |
| 4,598,179 | 7/1986 | Clark et al. | 379/200 |
| 4,680,785 | 7/1987 | Akiyama et al. | 379/57 |
| 4,893,329 | 1/1990 | O'Brien | 379/88 |
| 4,894,861 | 1/1990 | Fujioka | 379/374 |
| 4,899,358 | 2/1990 | Blakley | 379/67 |
| 4,924,496 | 5/1990 | Figa et al. | 379/142 |
| 4,958,153 | 9/1990 | Murata et al. | 340/825.5 |

FOREIGN PATENT DOCUMENTS

| | | | |
|---|---|---|---|
| 0117459 | 9/1981 | Japan | 379/142 |
| 0038055 | 3/1983 | Japan | 379/374 |
| 0287361 | 12/1986 | Japan | 379/374 |
| 0288541 | 12/1986 | Japan | 379/142 |
| 0092648 | 4/1987 | Japan | 379/199 |
| 63-275248 | 11/1988 | Japan | 379/447 |
| 0002461 | 1/1989 | Japan | 379/142 |
| 0105648 | 4/1989 | Japan | 379/142 |
| 0109946 | 4/1989 | Japan | 379/142 |
| 0137761 | 5/1989 | Japan | 379/199 |
| 0248858 | 10/1989 | Japan | 379/199 |
| 0051937 | 2/1990 | Japan | 379/199 |
| 0135851 | 5/1990 | Japan | 379/142 |
| 0177648 | 7/1990 | Japan | 379/374 |
| 0216944 | 8/1990 | Japan | 379/374 |
| 0009643 | 1/1991 | Japan | 379/199 |

OTHER PUBLICATIONS

"Text-To-Speech Synthesis for Pronouncing Names and Addresses . . . " C. J. Karban et al., *Proc. of Avios Systems Application Conf.*, Sep. 1986, pp. 1–7.
"Whether to Answer the Phone", *The Washington Post*, Dec. 7, 1986, p. D6.

*Primary Examiner*—Thomas W. Brown
*Attorney, Agent, or Firm*—Jacobson, Price, Holman & Stern

[57] ABSTRACT

An alphanumeric caller identification telephone is disclosed which has several advantages and novelties. Among them are that when certain predetermined incoming calls including a number or name are received, this apparatus can display not only the received number, but can also spell, speak or display the name of the caller. In addition, this apparatus can be set to ring, alert or even activate a plurality of control outputs when certain incoming calls including a number or name are received. The activation of alarm(s) and control output(s) can also be set during a predetermined time interval only. Furthermore, this phone has an infrared transmission system, which can transmit recorded data between units.

3 Claims, 4 Drawing Sheets

ALPHANUMERIC CALLER IDENTIFICATION TELEPHONE

BACKGROUND OF THE INVENTION

Caller identification telephones have been developed in recent years. The most important ones deviced are described in U.S. Pat. No. 4,242,539 to Hashimoto and U.S. Pat. No. 4,592,956 to Doughty.

The method/apparatus developed by Hashimoto has economic drawbacks. However, the method/apparatus developed by Doughty enjoys practical use.

Two other related patents are U.S. Pat. No. 4,304,968 issued Dec. 8, 1981 to Klausner et al. and U.S. Pat. No. 4,924,496, issued May 8, 1990 to Romek Figa Both patents have the same function: when a phone number is received, the telephone will compare the phone number of the caller with a stored directory of numbers and associated names. If the same number is stored in the directory, the associated name will be displayed.

The difference between the these two patents is that in the Klausner et al. patent, the numbers should be dialed and sent by the caller himself; in the Romek Figa et al. patent, the number is delivered by the phone company. However, some telephone companies already have a name delivery service and more and more telephone companies will have name delivery service soon. In the interest of privacy, people prefer to have name delivery rather than number delivery.

The present invention is a further development of the above patents. The method/apparatus developed by the present invention can not only automatically transfer certain received number(s) to name(s) to be shown on the display, but can also spell or speak the name of the received number/name. Besides, the device can be set to activate a special ring/alert or enable a control output for certain particular predetermined numbers or names being received. Furthermore, the alarm/ring or control output can further be enabled or disabled during certain hours or time frames only.

OBJECT OF THE INVENTION

A first object of the present invention is to convert certain received telephone numbers delivered by a central office to the name corresponding to this number and to display same on the screen and also to spell or speak the name of a received number/name.

A second object is to enable or disable the ring or alarm when certain predetermined numbers/names are received, and accompanying the alarm, or instead of the alarm, activation of a control output so that some other functions can be controlled.

A third object is to enable or disable the alarm or control during predetermined hour(s) or time intervals only.

BRIEF DESCRIPTION OF THE DRAWINGS

The invention can be described in detail with reference to the drawings.

DETAILED DESCRIPTION OF THE PREFERRED EMBODIMENT

Figure 1:
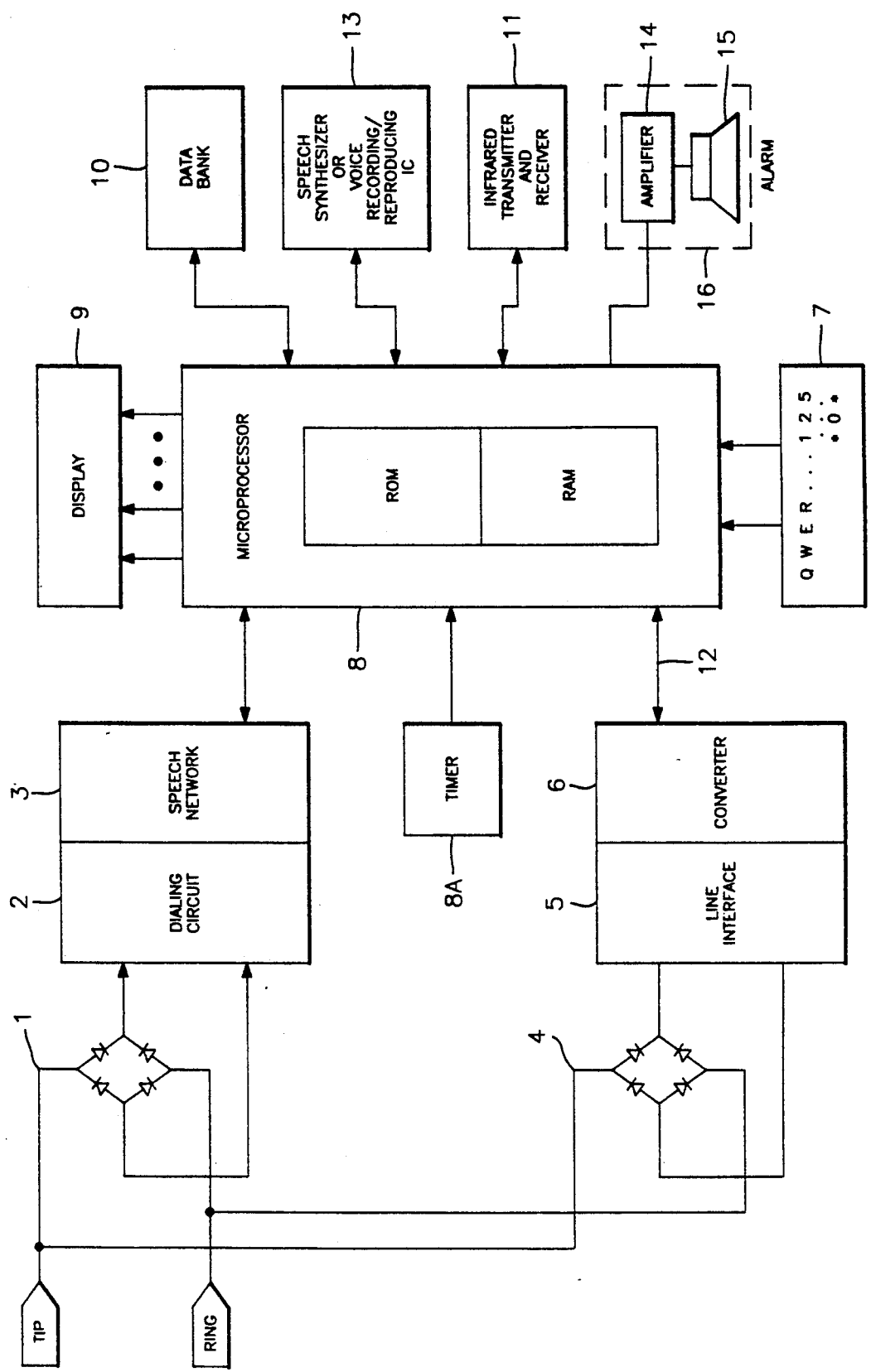
FIG. 1 shows a block diagram of the alphanumeric caller identification telephone of the invention.
Figure 2:
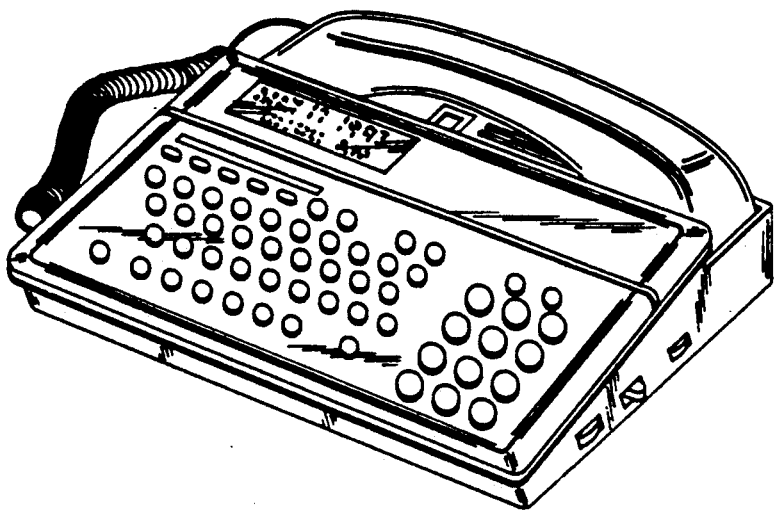
FIG. 2 is a perspective view of a telephone embodying the invention.

The general organization of one embodiment of the invention is illustrated in the block diagram of FIG. 1. The apparatus is connected to the tip and ring of the telephone line via bridge networks 1, 4 (polarity guard) in order to ensure a right polarity for the dialing circuit 2, speech network 3, line interface 5 and converter 6.

Dialing circuit 2 and speech network 3 are conventional circuits and commercially available. Line interface 5 and converter 6 are the same as disclosed Doughty's U.S. Pat. No. 4,582,956.

Microprocessor 8 receives signals/instructions from converter 6, keyboard 7 and infrared receiver 11. A list of names and numbers is stored in the data RAM (memory) 10, which is input by using the alphanumeric keyboard 7 upon instructions by the microprocessor 8. An infrared receiver/transmitter 1 is also used to record names and numbers to the RAM 10 through microprocessor 8.

When a caller's number/name is received, converter 6 will send the data signal to the microprocessor 8 via input lead 12. Microprocessor 8 can examine the, and data signal if a name is included, then the name will be simply spelled or spoken by the speech synthesizer or voice recording/reproducer 13. If only a number is received, microprocessor 8 will compare the received number with all the numbers stored in the data RAM 10. If there is a number which is the same as the received number, the microprocessor 8 will access the name associated with the number and instruct the speech synthesizer or voice reproducer to spell o speak the name and show the name in the display 9. Microprocessor 8 can further proceed only if there is a same name stored in the memory; and/or there are extra special codes appended with the name or number, the speech synthesizer or voice reproducer and/or alarm 16 and/or control output will be activated when the name is stored in memory.

Furthermore, the alarm/control output can be a plurality of different alarms/outputs; and different appended codes activate different alarms/outputs depending upon the alarm desired for each particular number/name.

The speech synthesizer IC and voice recorder/reproducer IC are all commercially available ICs. When a call comes in, speaking is better than spelling the caller's name. However, in the near future, the facility for spelling a caller's name is much more economical than speaking the name.

The apparatus is also provided with a digital clock 8A. The microprocessor will look over all time intervals. The speech synthesizer or voice reproducer and/or alarm and/or control output can be activated only at a predetermined time and for a predetermined time interval which is set by the user.

Figure 3:
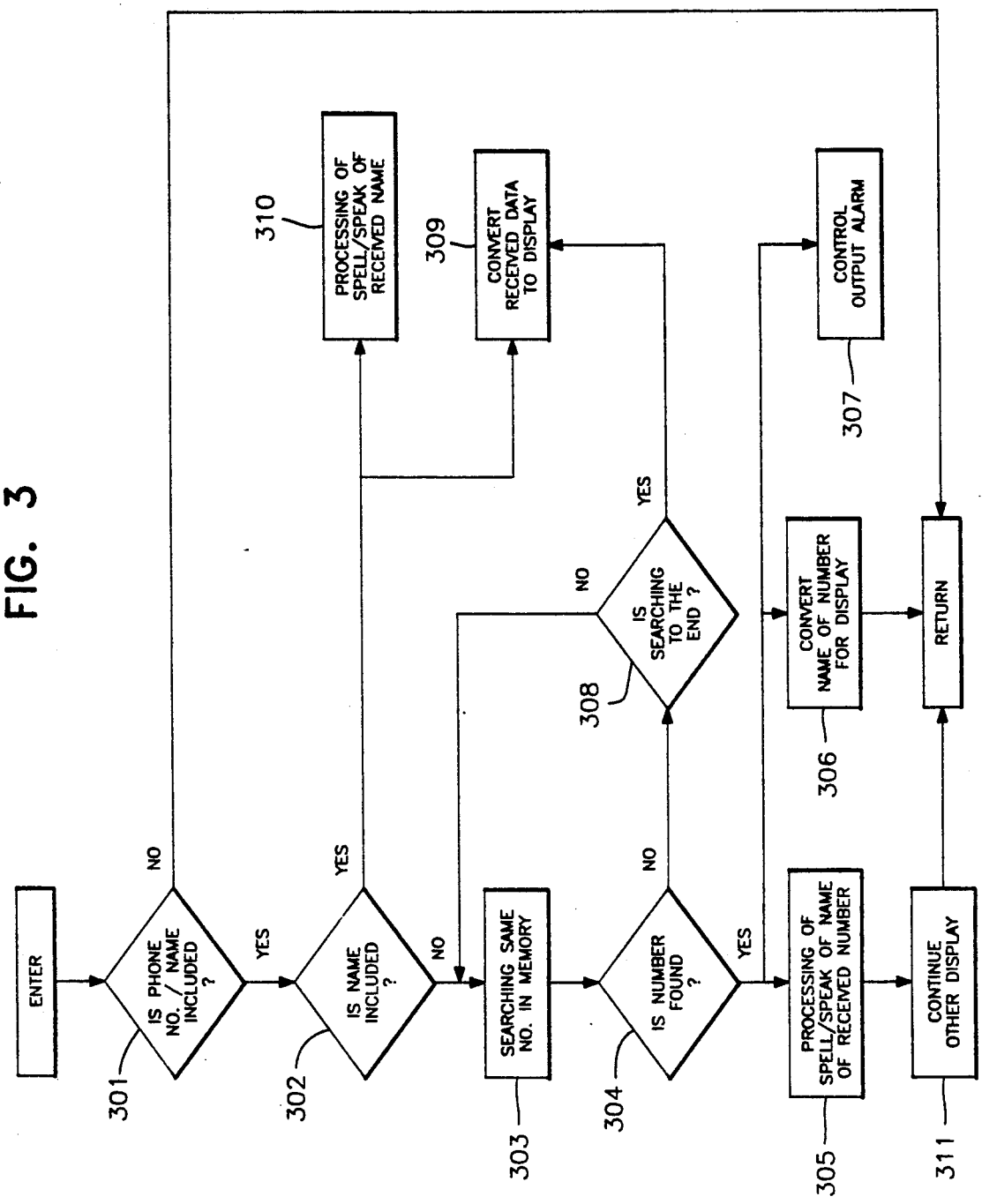
FIG. 3 shows a detailed flow diagram of the routines which, if the name of a caller is received, then, directly, the name will be spelled/spoken/displayed. If only a number is received, and there is a number stored in the memory which is the same as the received number, the caller's name of that particular number will be spelled or spoken and/or shown on the display, and at the same time, a control output can be activated and/or an alarm alerted.

Depicted in FIG. 3 is the routine for comparison of a received number/name with a stored name and number and spelling or speaking the name and/or conversion of number to name for showing on the display 9.

When the CPU 8 receives the caller's message as data from the converter 6, the CPU will examine whether a phone number/name is included in the message (block 301). If the phone number/name is not included, the CPU will (instruct the phone to) return to its normal idle and waiting mode. If the phone number/name is included, the CPU will further examine whether the name is included in the message (block 302). If it is included, the CPU will simply go to the process of spelling or speaking the name (block 310) and/or converting the data of the received message (name and number) to show on the display (block 309). If the name is not included, the CPU will go to searching and comparing (block 303), whether there is a same number stored in RAM 10. The searching will start from the beginning of the list of all stored numbers (block 304). If the searching has come to the end of the list (block 308) and there is no same number found, the CPU will convert the data of the received message (number) to show on the display (block 309). If a same number is found, the CPU will process the spelling or speaking of the name of the received number and/or converting the name of the number to show on the display (block 306) and also activate the alarm and the control output(s) for controlling something (block 307).

Figure 4:
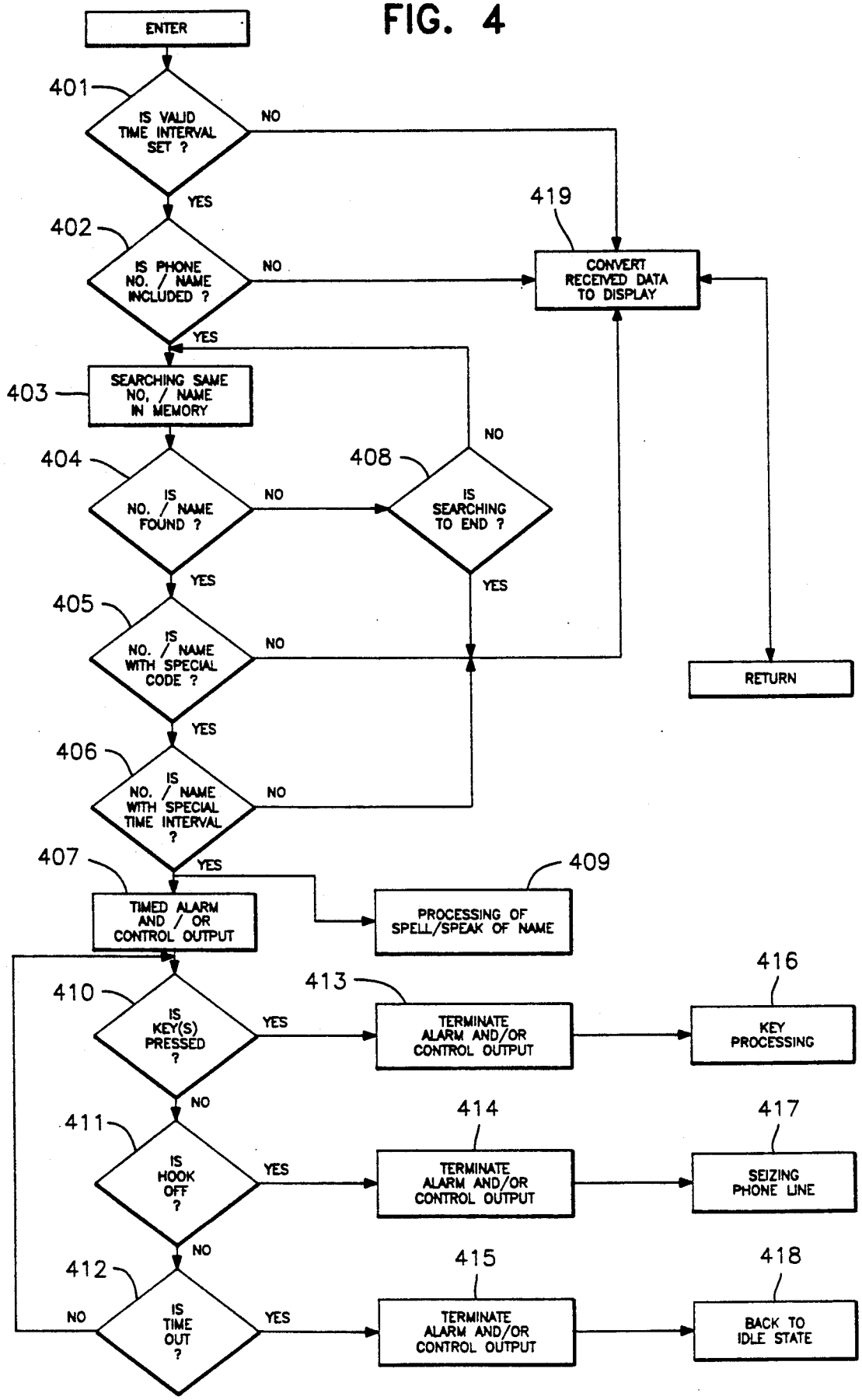
FIG. 4 shows a flow diagram of the routines of spelling/speaking the name of the caller and activating the required control output or alarm/ring, only when the stored name or number for comparison is appended with a special code such as *, #, etc.; and/or time interval.

FIG. 4 shows the routines of spell/speak of a name and/or activating the control output(s) and/or an alarm only when a same number/name is stored in the memory and/or a special code or a predetermined time interval is set and appended to each name or number. While the caller's data from the converter 6 is received by the CPU 8, the CPU will examine whether it is within the preset time interval (block 401). If not, the CPU will enter a subroutine for converting received data for display (block 419). If it is within the preset time interval, the CPU will examine whether the phone number/name is included in the received data (block 402). If not, a subroutine for data converting for display will be entered (block 409). If the phone number/name is included, the CPU will search and compare the list of all stored numbers and names (block 403 and block 404) to determine whether there is a same number/name stored in the RAM 10. If a same number/name is not found until the end of the searching (block 408), the subroutine for converting received data for display (block 419) will also be entered. If the same number or name is found, the CPU will examine whether or not the name or number is appended with a special code (block 405). If not, subroutine 419 will be entered again. If yes, the CPU will examine whether that name or number is appended with a preset time interval or not (block 406). If not, subroutine 419 will also be entered. If a time interval is included and the clock is within the time interval, the CPU will process the spelling/speaking of the name (block 409) and/or activate the control output of the timed alarm (block 407). The activating of the output control and alarm can be terminated by pressing of key(s) on the keyboard (block 410), or the hook is off (block 411), or time is out (block 412).

If for simplicity, the time factor (block 401 and block 406) can be skipped, then the spelling/speaking of the name and/or the activation of the alarm and/or control output is only determined upon whether or not there is a special code appended with the name or number. Besides, the factor of a special code (block 405) can also be skipped, then the spelling/speaking of the caller's name is only determined by whether or not the name/number is stored in the memory.

A list of numbers and names, along with special codes appended to the numbers and names, can be typed and stored into the memory (data RAM 10) using the keyboard 7. As described, an infrared data transmission system is also provided. The list of names and numbers with special codes can also be recorded into the memory via the infrared transmission system from another unit. On the other hand, the stored lists of names and numbers with special codes of this unit can also be transmitted to other units. In practical use (for saving of cost), the dialing circuit 2 and speech network 3 can be deleted, then the remaining parts of the circuit consist of an add-on device for adding on to any existing telephone set for displaying the caller's data. Furthermore, the keyboard 7 can also be deleted, then the list of names and numbers and special codes can be recorded into the memory via the infrared system from another unit.

What is claimed is:

1. A caller identification telephone device comprising:
    memory means for storing a list of telephone numbers with an associated name for each of said stored telephone numbers, and further for storing an instruction code appended to at least one of said stored telephone numbers with said associated name,
    processing means for comparing a received incoming call number with said telephone numbers stored in said memory means, and for detecting whether an instruction code is appended to one of said stored telephone numbers with said associated name, and for decoding said instruction code and activating at least one control output corresponding to said instruction code if a received number is the same as one of said stored telephone numbers and if said instruction code is appended to said one of said stored numbers with said associated name, and for enabling or suppressing a ring/alarm in response to said at least one control output,
    display means for displaying said stored name associated with said one of said stored telephone numbers in response to said at least one control output from said processing means, and
    means for generating said ring/alarm in response to said at least one control output from said processing means.

2. A caller identification telephone device as claimed in claim 1, further comprising speech generating means for one of spelling or speaking said stored associated name of said one of said stored telephone numbers in response to said at least one control output of said processing means.

3. A caller identification telephone device as claimed in claim 1, further comprising means for keeping minutes and hours of the day, and said memory means including a time period code appended to each of said numbers and associated names stored in said memory means so that after an incoming number is received and matched with a particular stored number by said processing means, said processing means decodes one of said time period codes and activates said at least one control output only during a time period corresponding to said one time period code as decoded by said processing means.

* * * * *